L. ANDERFUHREN.
PNEUMATIC TIRE ALARM.
APPLICATION FILED SEPT. 3, 1919.
1,327,416.
Patented Jan. 6, 1920.
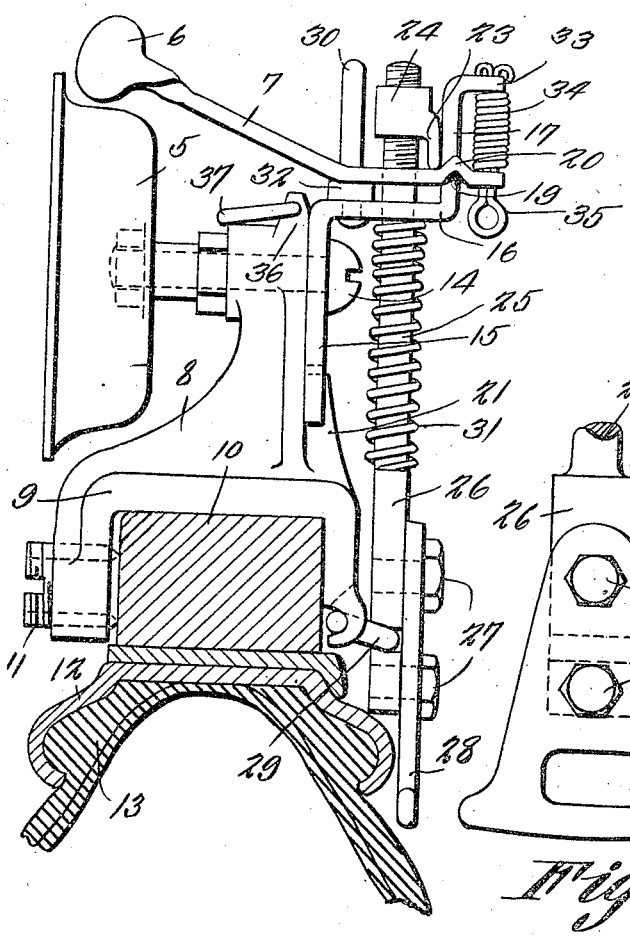
Fig. 1.
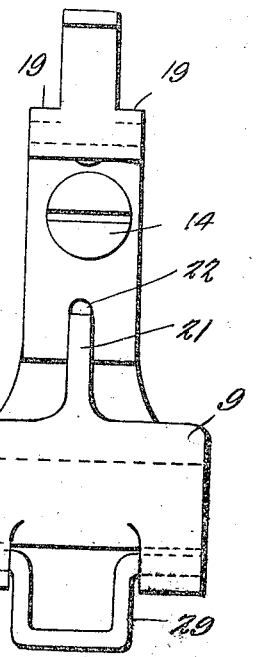
Fig. 3.
Fig. 4.
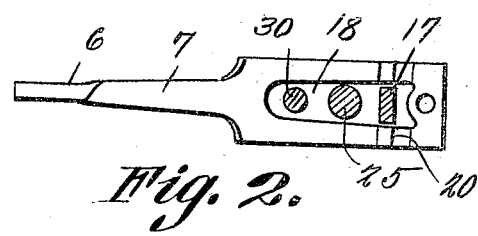
Fig. 2.
Inventor
Louis Anderfuhren
By Henry G. Brewington,
Attorney

UNITED STATES PATENT OFFICE.

LOUIS ANDERFUHREN, OF BALTIMORE, MARYLAND.

PNEUMATIC-TIRE ALARM.

1,327,416.  Specification of Letters Patent.  Patented Jan. 6, 1920.

Application filed September 3, 1919. Serial No. 321,342.

*To all whom it may concern:*

Be it known that I, LOUIS ANDERFUHREN, a citizen of the United States, residing at Baltimore, State of Maryland, have invented certain new and useful Improvements in Pneumatic-Tire Alarms, of which the following is a specification.

This invention relates to devices applicable to pneumatic tires used on motor vehicles, and operating to give warning when the tire becomes deflated to such an extent that it is liable to be damaged if the driver continues to run the car.

The invention has for its object to provide a novel and improved audible signal or alarm device of the kind stated which is reliable in operation, comparatively simple in construction and readily attachable to the wheel equipped with the tire to be guarded.

With the object stated in view, the invention consists in a combination and arrangement of parts to be hereinafter described and claimed, and in order that the same may be better understood, reference is had to the accompanying drawing forming a part of this specification.

In the drawing,

Figure 1 is an elevation of the device in place on the wheel, a fragment of the latter being shown in cross-section;

Fig. 2 is a plan view of the bell-clapper and certain parts associated therewith, the latter being in section, and Figs. 3 and 4 are front elevations of certain details of the structure.

Referring specifically to the drawing, the signal or alarm device is a bell, the shell of which is shown at 5 and its clapper at 6, the latter having a stem 7. The device is secured to the wheel by a base member 8 having a U-shaped clamping part 9 which is positioned to straddle the felly 10 of the wheel and is fastened thereto by a clamping screw 11 engaging one side of the felly, as shown in Fig. 1. The wheel felly 10 is equipped with an ordinary rim 12 carrying a pneumatic tire, a fragment of which is shown at 13. The bell 5 is secured to the base member 8 by a screw bolt or other suitable means 14.

The bell 5 is located on one side of the base member 8, and to the opposite side of the latter is secured a bracket member 15 having at its outer end a lateral bend 16 terminating in a forward bend 17 which forms a pivotal support for the clapper or bell-hammer stem 7, said part 17 having a reduced outer portion which passes through a recess 18 in the rear end of the stem 7 and forms shoulders 19 on which the stem seats and is thus fulcrumed or pivoted. The stem 7 is made with a bend 20 which forms a recess seating the shoulders 19.

A lug 21 seating in a slot 22 in the member 15 prevents the latter from turning, its sole attaching means being the screw bolt 14.

On one side of its pivot or fulcrum, the clapper stem 7 is engaged by an abutment in the form of a finger 23 extending from a nut 24 screwed on a rod 25 which passes through the recess 18 and extends radially with respect to the wheel. Alongside the felly 10, the rod 25 has an enlargement or head 26 to which is bolted or otherwise fastened, as shown at 27, a foot piece 28 in the shape of a flat plate located alongside the rim portion of the wheel and having its extremity located close to the side of the tire 13 adjacent to where it is engaged by the rim 12.

One of the branches of the clamping part 9 of the base member 8 carries a swinging link 29 which is connected to the part 26. It will therefore be seen that the rod 25 is supported so that it is free to slide in the direction of its length, and radially with respect to the wheel.

From the part 16 rises a guide post 30 for the clapper stem 7, said post passing through the recess 18 of the latter. This post also limits the upward swing of the clapper stem by coming against the adjacent end of the recess 18.

Between the part 16 and the head 26, a spring 31 is coiled around the rod 25, said spring tending to slide the latter outwardly or in the direction of the tire 13, and normally holding the finger 23 in contact with the clapper stem 7. A block 32 under the clapper stem 7 limits its swing in a direction toward the bell 5, and the clapper 6 is normally spaced slightly from the bell.

Between the rear end of the clapper stem 7 and a lateral bend 33 at the extremity of the part 17 is a spring 34, the same being coiled around a pin or other suitable member 35 connecting the clapper stem and the part 33. This spring raises the clapper stem 7 when the latter is released by the spring 31.

The outer end of the base member 8 has a lug 36 which supports a link 37, which latter, when it is swung beneath the stem 7, acts as a prop to hold the clapper 6 clear of bell so that the latter may be cleaned, and which also makes it possible to run on a flat tire without actuation of the bell.

Fig. 1 shows the normal position of the parts, and the tire is supposed to be properly inflated. The foot piece 28 is clear of the tire 13. If now the tire becomes deflated, it will come in contact with the foot piece 28 once every revolution of the wheel, and the pressure of the tire against the foot piece will slide the rod 25 inwardly. This movement of the rod 25 will retract the finger 23 whereupon the spring 34 swings the clapper stem 7 in a direction to carry the clapper 6 away from the bell 5. This action takes place when the device is at the bottom of the wheel. As the wheel continues to turn, the flattened portion of the tire tends to expand again, with the result that it recedes from the foot piece 28. The spring 31 now forces the rod 25 downwardly, and through the finger 23 the clapper stem is given a sharp stroke to sound the bell. This action takes place once every revolution of the wheel. The spring 31 takes up all lost motion in the clapper stem 7 and the link 29, so that when the tire becomes deflated, a slight upward pressure of the latter against the foot piece 28 suffices to sound the bell. Lost motion is also kept out of the link 29 by the finger 23 which presses on the clapper stem 7 at a point off the center line of the spring 31, and which also brings it very close to the fulcrum of the clapper stem so that a very slight movement of the foot piece 28 will cause the bell to be sounded, it being understood that the foot piece does not touch the tire if it is properly inflated.

I claim:

1. A tire alarm comprising a bell, a pivoted clapper for sounding the bell and provided with a stem, a supporting member for the bell and the clapper stem, said member having means for attachment to a wheel, a slidable rod carried by the supporting member and extending radially with respect to the wheel, said rod having a part at its extremity seating adjacent to the tire for engagement thereby when the tire is deflated, an abutment on the rod engaging the clapper stem, a spring for sliding the rod in a direction to actuate the clapper stem, and a spring engageable with the clapper stem for retracting said stem when the aforesaid abutment leaves the same.

2. A tire alarm comprising a bell, a pivoted clapper for sounding the bell and provided with a stem, a supporting member for the bell and the clapper stem, said member having means for attachment to a wheel, a slidable rod carried by the supporting member and extending radially with respect to the wheel, said rod having a part at its extremity seating adjacent to the tire for engagement thereby when the tire is deflated, an abutment on the rod engaging the clapper stem, a spring for sliding the rod in a direction to actuate the clapper stem, and a pivoted prop carried by the supporting member and engageable with the clapper stem to hold the same in an inoperative position.

In testimony whereof I affix my signature.

LOUIS ANDERFUHREN.

Witnesses:
E. WALTON BREWINGTON,
HOWARD D. ADAMS.